United States Patent [19]

Beziers

[11] Patent Number: 4,789,505
[45] Date of Patent: Dec. 6, 1988

[54] PROCESS FOR THE POLYMERIZATION AND/OR CROSSLINKING OF A RESIN USED IN THE COMPOSITION OF A COMPOSITE MATERIAL PART BY MEANS OF IONIZING RADIATION

[75] Inventor: Daniel Beziers, Saint Medard en Jalles, France

[73] Assignee: Societe Nationale Industrielle Aerospatiale et, Paris, France

[21] Appl. No.: 40,589

[22] Filed: Apr. 21, 1987

Related U.S. Application Data

[62] Division of Ser. No. 733,499, May 10, 1985, Pat. No. 4,689,488.

[30] Foreign Application Priority Data

May 11, 1984 [FR] France .................. 84 07333

[51] Int. Cl.$^4$ .................................. B29C 35/08
[52] U.S. Cl. ..................... 264/22; 250/492.1; 264/236; 264/347; 425/174.4; 522/34
[58] Field of Search ............... 264/22, 236, 347; 425/174.4, 174.8 R; 250/492.1, 492.3; 522/34

[56] References Cited

U.S. PATENT DOCUMENTS

| | | |
|---|---|---|
| 2,793,970 | 5/1957 | Jeppson .................. 264/22 |
| 2,863,812 | 12/1958 | Graham .................. 264/22 |
| 2,914,450 | 11/1959 | Hammesfahr et al. .......... 264/22 |
| 2,919,473 | 1/1960 | Cole .................... 264/22 |
| 2,963,747 | 12/1960 | Brown .................... 264/22 |
| 3,144,398 | 8/1964 | Rainer et al. ............ 264/22 |
| 4,484,341 | 11/1984 | Luniewski ............... 250/492.3 |

FOREIGN PATENT DOCUMENTS

| | | |
|---|---|---|
| 3006604 | 8/1981 | Fed. Rep. of Germany ...... 264/22 |
| 2217140 | 9/1974 | France . |
| 49-06399 | 1/1974 | Japan .................... 264/22 |
| 8003671 | 2/1981 | Netherlands ............. 264/22 |
| 814720 | 6/1959 | United Kingdom .......... 264/22 |
| 893989 | 4/1962 | United Kingdom . |
| 1402733 | 8/1975 | United Kingdom .......... 264/22 |
| 1455264 | 11/1976 | United Kingdom . |

Primary Examiner—Jeffery Thurlow
Attorney, Agent, or Firm—Michael N. Meller

[57] ABSTRACT

A part made of a resin-containing composite material, also having at least one insert made of a different material, is hardened by electron beam radiation in zones having a surface mass at the most equal to 4 g/cm$^2$ and by X-radiation in zones having a surface mass above 4 g/cm$^2$. The X-radiation, in doses up to 10 Mrad, is produced by action of the electron beam on a target placed between the part and the electron beam.

8 Claims, 2 Drawing Sheets

PROCESS FOR THE POLYMERIZATION AND/OR CROSSLINKING OF A RESIN USED IN THE COMPOSITION OF A COMPOSITE MATERIAL PART BY MEANS OF IONIZING RADIATION

This is a division of application Ser. No. 733,499, filed May 10, 1985, now U.S. Pat. No. 4,689,488, issued Aug. 25, 1987.

BACKGROUND OF THE INVENTION

The present invention relates to a process and to an apparatus for the polymerization and/or crosslinking of a resin used in the composition of a composite material part using ionizing radiation. It makes it possible on an industrial scale to polymerize and/or crosslink resins used in the composition of thick or solid parts, i.e. parts having a surface mass which can locally or entirely exceed 4 g/cm$^2$.

These composite material parts are of two types, namely parts having a simple structure and those having a complex structure. The former are formed from elements such as fibres, grains, powders, etc bonded to one another by hardening resins, said elements being regularly distributed in space. The latter are formed in the same way as the former, but also have e.g. metallic or radio hardening objects or inserts, such as of rubber, which are entirely or part incorporated into the resin. These parts having a simple or complex structure are more particularly used in the motor vehicle, aeronautical, space and similar fields.

The hardening processes leading to the polymerization and/or crosslinking of the resins include a first group of so-called conventional processes covering on the one hand those using cold resin systems, i.e. polymerization in the open air without any heat supply, and on the other hand processes using a resin system, whereof the polymerization is obtained by raising the temperature in the oven. These processes are respectively called cold and hot conventional processes.

The cold conventional processes are difficult to perform and give materials with a very poor thermal behavior. The hot conventional processes give better materials, but suffer from faults due to thermal effects, such as internal stresses, cracks, delaminations in the case of thick parts, whilst the polymerization times lead to long production cycles having serious financial consequences from the investment and energy consumption standpoints.

A second group of processes called "by radiation" also include processes without raising the temperature and processes involving raising the temperature. The latter more particularly include microwaves, high frequency, infrared and suffer from the disadvantages of the so-called hot conventional processes.

Processes by radiation such as X, gamma and UV as well as electrons permit a polymerization and/or crosslinking without raising the temperature, these consisting of ionizing rays.

Relatively low energy ultraviolet rays permit a slight penetration of composite materials. Gamma rays suffer from the disadvantage of not being focused, which leads to a very slow polymerization and/of crosslinking. In addition, it is difficult to use these rays because they come from permanent radioactive sources, which are consequently difficult to industrially transpose.

X-rays, obtained from existing X-ray generators are not very suitable for the polymerization and/or crosslinking of thick parts due to lack of power, so that there is a low dose rate and inadequate dimensioning of the beam.

Electron bombardment or radiation is a very efficient, high performance process. In particular, it makes it possible to obtain very high quality composite materials in a relatively short time and using relatively low energy levels. Moreover, it is compatible with all fiber types used in the composition of composite materials.

However, the penetration of the electrons into the composite material is dependent on the characteristics of the energy generator, the density of the material and to a lesser extent the absorption coefficient thereof. The penetration of the parts by electron radiation is 0.35 to 0.45 g/cm$^2$/MeV and is consequently equivalent to the penetration into a material having a surface mass varying from 3.5 to 4.5 g/cm$^2$ for a generator with an energy level of 10 MeV. The surface mass value is dependent on variations of the absorption coefficients of the materials forming the structure.

Apart from the disadvantages of processes by radiation accompanied by a temperature rise, the use of infrared only permits a limited penetration of the composite material and which is at the most equal to 1 millimeter, penetration being limited by certain fibers, such as carbon in the case of the microwave process (UHF).

With regards to UHF, the use of such rays is still at the research stage and consequently industrial development is virtually non-existent, particularly for the production of parts having a complex structure. Moreover, the use thereof for complex parts leads to significant realization problems and they are generally only usable for parts having a simple shape, such as parallelepipedic or cylindrical.

SUMMARY OF THE INVENTION

The present invention relates to a process for the cold polymerization and/or crosslinking of a resin used in the composition of a composite material part making it possible to overcome the disadvantages inherent in the aforementioned prior art processes. In particular, it makes it possible to polymerize and/or crosslink resins used in the composition of thick or solid composite material parts at low cost, said parts having thermal behavior characteristics which are at least equivalent to those obtained by the presently used processes.

The process of the invention is an industrial polymerization and/or crosslinking process for a radiohardening resin, i.e. hardening by ionizing radiation, used in the composition of a simple or complex composite material part having at least one insert of a different nature from the resin and with a variable surface mass. It is characterized in that the zones of the parts having a surface mass exceeding 4 g/cm$^2$ are subject to X-radiation at doses up to 10 Mrad adequate for crosslinking the resin. When the insert is a radiohardening product, use is made of X-radiation doses exceeding 10 Mrad for crosslinking said radiohardening products.

Although conventional X-ray production means have been used for the polymerization and/or crosslinking of resins, this has only been on an experimental basis. Moreover, said equipment does not make it possible to provide dose rates and doses which are as high as those used in the invention.

The process according to the invention, which makes it possible to deal with very thick composite material parts, i.e. whose surface mass is locally or completely above 4 g/cm$^2$, is compatible with all types of fiber used in the production of composite material. Moreover, the composite materials obtained are of very good quality, particularly because the polymerization and/or crosslinking of the resins constituting the same takes place without heating. Finally, this process is much faster than the prior art processes. The process according to the invention, which is suitable for producing thick or solid parts, can be advantageously used in the case of parts having a variable thickness.

According to a preferred embodiment of the process according to the invention, an electron beam is supplied to the part to be treated in order to polymerize the resin in zones thereof having a surface mass at the most equal to 4 g/cm$^2$ and between the part and the electron beam is arranged a target, in order to polymerize the resin in the zones of the part having a surface mass above 4 g/cm$^2$, said target being able to produce X-radiation under the action of the electron beam.

According to a preferred embodiment of the process according to the invention, the electron beam has an energy level at least equal to 10 MeV and a power at least equal to 10 kW.

The polymerization and/or crosslinking process according to the invention can advantageously be used for polymerizing and/or crosslinking resins having an ethylenic unsaturation. For exmaple, these resins are epoxy resins, polyesters or polyurethanes with acrylic terminations.

Hitherto, such resins were used in thin surface film form as inks or varnishes for protection, decoration impression, etc and not for the production of composite materials, more particularly forming thick parts as defined.

According to a preferred embodiment of the process according to the invention, there is a relative movement between the part and the ionizing radiation, so that all or some of said part is exposed to said radiation.

The present invention also relates to an apparatus making it possible to perform the aforementioned process. This apparatus is characterized in that it comprises means for producing an electron beam, means for directing the electron beam onto a target, which is able to produce, under the action of the electron beam, X-radiation making it possible to obtain doses up to 10 Mrad, means for effecting a relative movement between the X or electron radiation and the part, so that the latter is partly or entirely exposed to the action of said radiation and optionally means making it possible to automate, servocontrol and control the complete apparatus.

The means for performing the relative movements between the ionizing radiation and the part are advantageously means making it possible to move the part in front of the radiation at a speed such that the resin constituting said part receives the necessary radiation dose for its polymerization and/or crosslinking.

According to a preferred embodiment of the apparatus according to the invention, the target is supported by retractable means making it possible to place it out of the electron beam.

According to another preferred embodiment of the apparatus according to the invention, the latter comprises means making it possible to modify the distance separating the part to be treated from the target.

According to a preferred embodiment of the invention, the apparatus advantageously comprises means making it possible to servocontrol the retractable means, in such a way that the zones of the part having a surface mass at the most equal to 4 g/cm$^2$ are subject to the action of the electron beam and the zones of the part having a surface mass exceeding 4 g/cm$^2$ are subject to the action of X-radiation.

These servocontrol means in particular comprise a computer, which stores the evolution of the surface mass of the part.

DETAILED DESCRIPTION OF THE PREFERRED EMBODIMENTS

Figure 1:
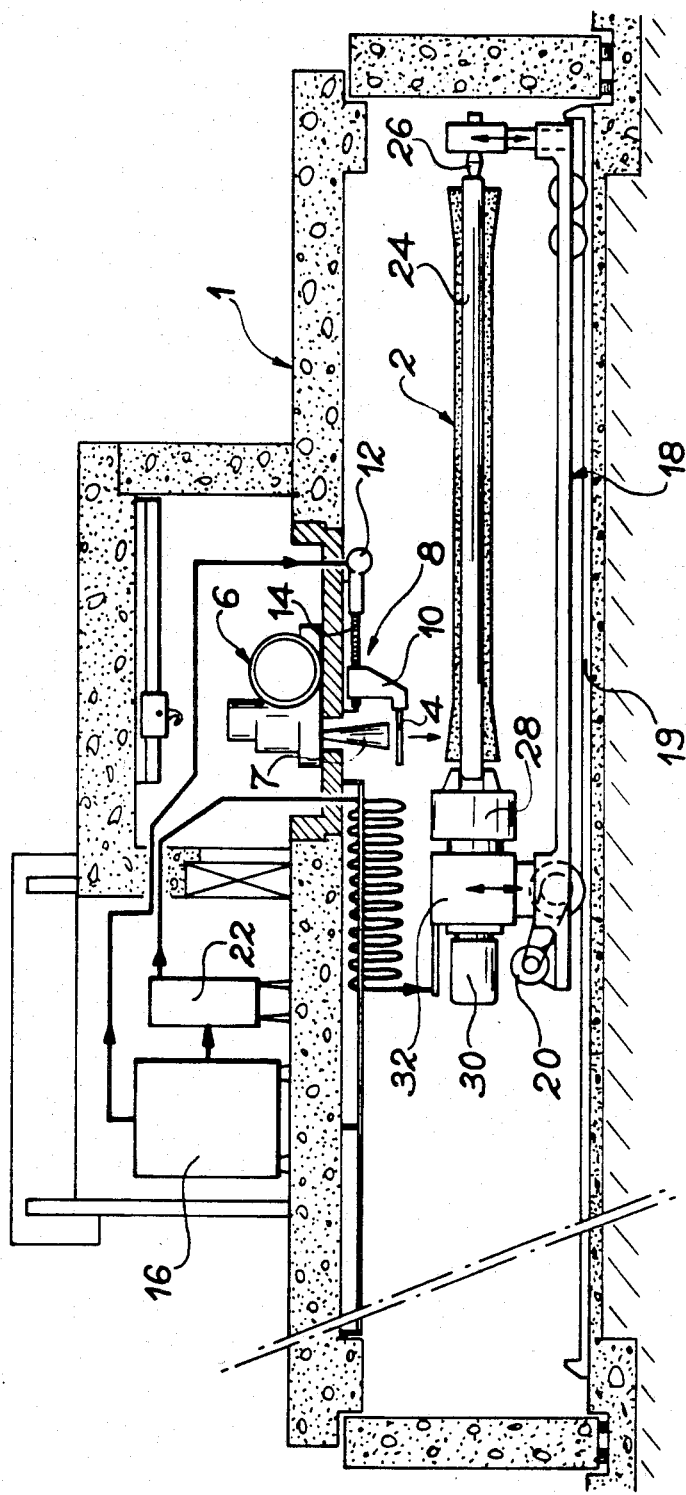
FIG. 1 diagrammatically and in longitudinal sectional shows the apparatus according to the invention.

With reference to FIG. 1, the process according to the invention consists of polymerizing, or more precisely crosslinking, in a tight enclousre 1 radio-hardening resins used in the composition of a composite material part 2 by subjecting said resins to the action of X or electron radiation in accordance with the specificity of part 2.

The X-radiation is advantageously obtained by bombarding a so-called conversion target 4 with the aid of an electron beam produced by an electron generator 6, e.g. of the CGR Cassitron type, having an element 7 making it possible to direct the electron beam produced by the generator onto the target 4.

Bearing in mind the generally low efficiency of conversion target 4 (below 10), it is preferable to use a high power, high energy electron generator 6, i.e. a generator supplying an energy at least equal to 10 MeV and a power at least equal to 10 kW.

The conversion target 4 can be constituted by a metal material having a high atomic number, i.e. exceeding 74. For example, use can be made of tungsten, lead or uranium.

The dimensions of the target being defined by the dimensions of element 7, the technical requirements for realization and the efficiency for obtaining information on the dose rate of the X-radiation produced by a particular target and consequently the exposure time, it is necessary to carry out a calibration beforehand, e.g. using a film dosimeter, in order to determine the efficiency of converting electrons into X-rays, the spatial distribution of the X-rays beneath the target, the spectral definition of said rays, the distribution of the dose in the resin to be polymerized and/or crosslinked and the dose necessary for polymerizing and/or crosslinking said resin.

The doses necessary for the polymerization and/or crosslinking of the resins constituting the parts to be treated vary between 2 and 10 Mrad. These doses are dependent on the irradiation time and the power of the X-radiation and consequently that of the electron beam, as well as the type of resin used. The resins forming a particular part are chosen as a function of their application, i.e. as a function of their mechanical and/or thermal properties.

For a given structure, the particular resin type is chosen in accordance with the fiber and the constraints, which makes it necessary to vary the dose required and this can also be expressed by the need to polymerize glue joints with materials differing from the chosen resins.

The resins usable in the process according to the invention are ethylene unsaturation resins, such as e.g. epoxy resins, polyesters or polyurethanes with acrylic terminations. These resins can be prepared by the addition of components, such as solvent or softening agent, in order to give them the special properties for polymerization and/or crosslinking under irradiation and/or for modifying their mechanical characteristics.

The radiohardening resins usable according to the invention polymerize or crosslink without any hardening agent (of the catalyst, photoinitiator or hardener type), said agent being generally necessary for polymerizing and/or crosslinking a resin by a thermal procedure or the like.

Under the effect of X-rays, the chemical bonds are broken producing free radicals, whose rapid recombination leads to the formation of new chemical bonds so that a three-dimensional macromolecular lattice is formed (crosslinking).

The use of X-radiation with a high dose rate makes it possible to polymerize and/or crosslink radiohardening resins used in the composition of a composite material constituting a thick part, i.e. a part which locally or entirely has a surface mass exceeding 4 g/cm$^2$. The surface mass of a part is the product of the density of the material forming it by the thicknesses of said material.

The process according to the invention is applicable to all parts formed from a reinforcement (fibers, fabrics, carbon, Kevlar, glass felts and other materials), a radiohardening resin and assembly parts and/or inserts, particularly of a metallic nature, as well as of other types of materials, such as rubber. These simple or complex structural parts can have any random shape. However, the process according to the invention is more particularly applicable to rotating bodies, as shown in FIG. 1.

According to the invention, it is possible to polymerize and/or crosslink radiohardening resins used in the composition of a part having a variable surface mass and in particular a variable thickness. For the areas of the part having a significant thickness, i.e. corresponding to a surface mass above 4 g/cm$^2$, the polymerization and/or crosslinking of the resin in these areas takes place with the aid of high dose rate X-radiation from a conversion target 4. Conversely, for the areas of the part having a limited thickness, i.e. corresponding to a surface mass at the most equal to 4 g/cm$^2$, the polymerization and/or crosslinking of the resin in these areas is carried out by electron bombardment.

The notion of surface mass is important, because its value imposes the choice of the X or electron radiation type to be used. Thus, the penetration of electrons into the resin of the part to be treated is limited to a surface mass of 4 g/cm$^2$ for an electron generator having an energy of 10 MeV. As shown by curve a of FIG. 2 giving the dose D in % as a function of the surface mass e in g/cm$^2$, said penetration is the useful penetration Pu and corresponds to a depth in the resin of the part to be treated where there is 100% of the radiation dose. Thus, for a surface mass exceeding 4 g/cm$^2$, X-radiation is used.

Figure 2:
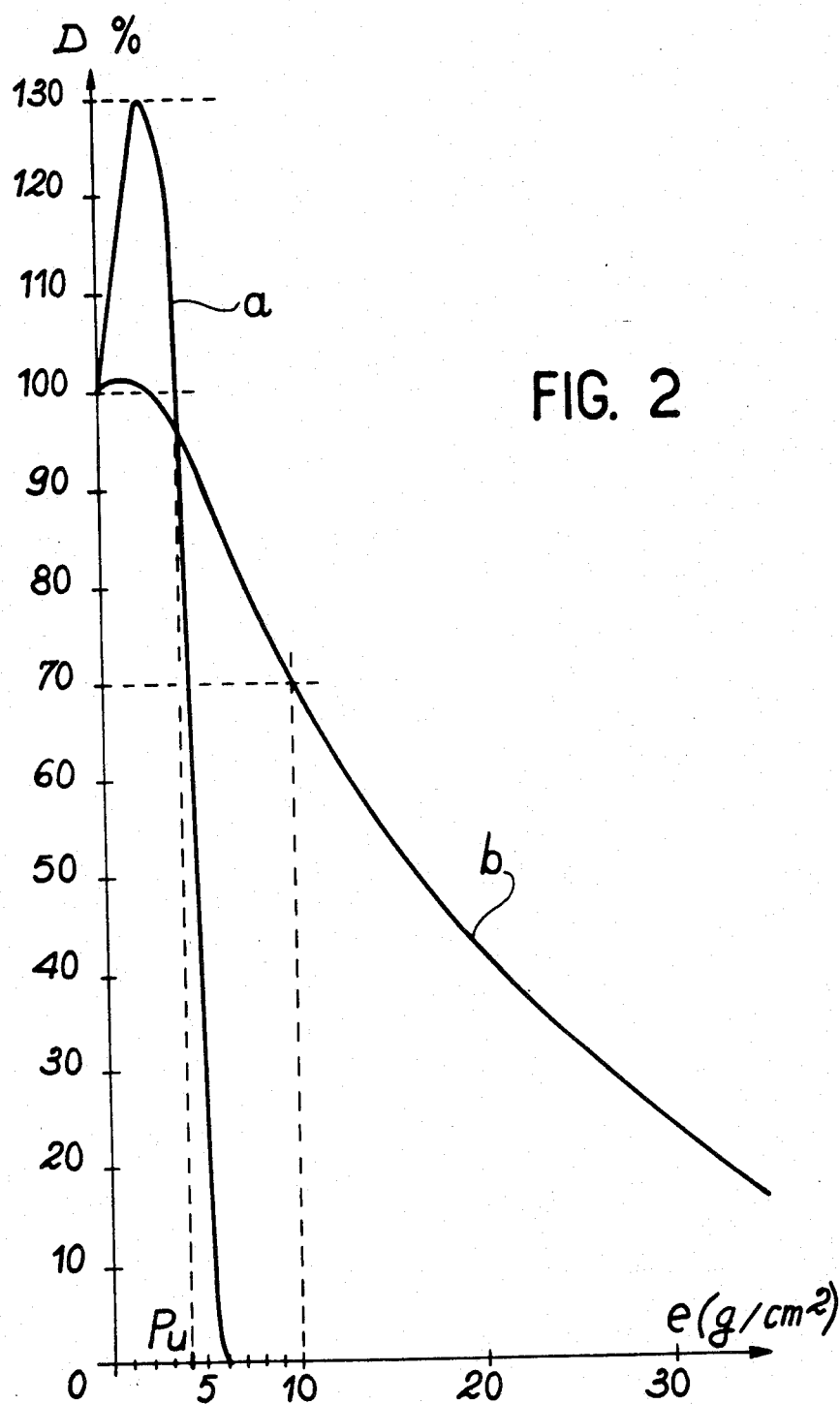
FIG. 2 shows curves giving the relative radiation dose D as a function of the surface mass e of the part to be treated, curve a relating to electron radiation and curve b to X-radiation.

In the case of X-radiation, the radiation is much greater in a ratio of approximately 1 to 6, as shown in FIG. 2. However, it is necessary to overdose the surface of the resin if it is wished to obtain an adequate irradiation dose at a given depth. For example, as shown by curve b, for a surface mass e of 10 g/cm$^2$, there is only 70% of the dose.

In order to be able to subject the limited thickness areas of the part 2 to be treated, i.e. with a surface mass at the most equal to 4 g/cm$^2$, to the action of an electron beam which is, according to the invention, produced by generator 6, the conversion target 4 must be placed outside the electron beam.

For this purpose, target 4 can be supported by retractable mechanical means 8 which can e.g. be formed, in the manner shown in FIG. 1, by a mobile support 10, whose displacement is controlled by a translation motor 12 via a nut - screw system 14.

This mechanical system 8 makes it possible to withdraw target 4 from the electron beam produced by generator 6, when it is wished to subject the part 2 to be treated to the action of electrons, but it also makes it possible to interpose the conversion target 4 between the electron beam and part 2, when it is wished to expose the latter to the action of X-radiation.

The changeover from one type of irradiation to the other takes place instantaneously by withdrawing or interposing target 4 between the electron beam and the part. Moreover, according to the invention, this takes place automatically as a function of the evolution of the thickness of the part to be treated, i.e. in accordance with the evolution of the surface mass of said part.

For this purpose, the displacement of support 10 of the target can be controlled by a computer or microcomputer 16, such as the microcomputer known under Intel reference SBC.

The treatment of a complete part, i.e. the polymerization and/or crosslinking of all the resin used in the composition of the part takes place by performing a relative movement between the part and the X or electron radiation and e.g. by moving said part in front of target 4 or the electron beam from generator 6. The movement of the part to be treated is carried out at a regulated, servocontrolled speed making it possible to obtain the irradiation dose necessary for the polymerization and/or crosslinking of the resin forming the part.

When the necessary irradiation dose is not obtained by a single passage of the part in front of the ionizing radiation (X or e), it can be carried out by several passages until the necessary irradiation dose is obtained.

In the case of an X or e irradiation, the movement speed is a function of the dose rate, the desired doses for the polymerization and/or crosslinking, the distance between part 2 and target 4, as well as the thickness of the part. This movement speed is governed by the equation $V = K_v/D$, in which V is the movement speed in cm/min, $K_v$ a coefficient which is experimentally determined, bearing in mind in the case of X-rays the conversion efficiency of the target, and consequently the dose, rate, as well as the spatial distribution of the X-rays and the distance between the part and the target, whilst for e account must be taken of the dose rate of the generator.

The maintaining in place of the part to be treated, as well as its displacement, are ensured by a conventional motorized mechanical device. For example, this system comprises a moving frame 18 mounted on rails 19 integral with enclosure 1. The displacement in translation of frame 18 is ensured by a translation motor 20, whose rotation speed is controlled, via a digital control module 22, by microcomputer 16. For example, this control module 22 is a microprocessor, like that known under the Intel reference 8085. Part 2 is mounted on a support shaft 24 having a direction perpendicular to the radiation and fixed between tailstock 26 and a mandrel 28 carried by frame 18.

In order to entirely subject the resin of part 2 to the action of X or electron radiation, part 2 can be rotated via mandrel 28 controlled by a motor 30, whose rotation speed is controlled by microcomputer 16, via the digital control module 22.

The dose necessary for the irradiation of the resin constituting part 2 is a function, in the case of X-radiation of the distance between target 4 and part 2, so that means are provided for modifying this distance, i.e. for displacing the rotation axis of the part in order to move the latter towards or away from the target as a function of the irradiation dose which it is wished to obtain. In the embodiment of FIG. 1, these means are constituted by a translation motor 32. As hereinbefore, the rotation of motor 32 is ensured by microcomputer 16, via control module 22.

It should be noted that the regulation of the distance separating part 2 and target 4 could be obtained by maintaining the part fixed and by displacing the target, whilst modifying the concentration of the beam in order to ensure the same dose rate.

Microcomputer 16 and digital control module 22 make it possible to ensure the integral automation of the mechanical device for the translation and rotation at given speeds of the part to be treated, as well as the interposing with desired distance and time of the target between the part and the electron beam or the withdrawal thereof.

Thus, on the basis of certain parameters or data, which will be explained hereinafter and stored in microcomputer 16, the latter can:

determine the type of irradiation (X or electron) to be used, control the movements of the target (interposing or withdrawal), regulate the movement speed of the part to be treated as a function of the irradiation dose for electron radiation, calculate, for X-ray irradiation, the surface doses, the number of passages and/or the passage speed of the part as a function of its profile and the surface dose, in the case of rotating bodies, regulate the rotation speed of the body, as a function of the evolution of its diameter, in such a way that the points of the body on the same circumference pass at the same speed beneath the ionizing radiation (X or electron) and optionally, control the movements of the target or the body, in such a way that the distance separating them is as small as possible, which makes it possible to optimize the dose rates of the X-radiation.

In order that microcomputer 16 can transmit the different orders or instructions, via control module 22, to the different mechanical systems, the latter must have in its memory for each part to be treated the relative X or e radiation dose, as a function of the surface mass, the relative X-radiation dose which is a function of the distance between the part and the target, the dose supplied which is a function of the passage speed of the part, the external profile of the part, the evolution of the surface mass as a function of the coordinates of the part, the calculation intervals and the dose necessary for the polymerization and/or crosslinking.

This automation is such that it guarantees constancy in the production of the parts, thus leading to an improvement in the overall quality of the composite material parts.

The combined use of X-ray and electron bombardment makes it possible to polymerize and/or crosslink resins used in the composition of thick composite material parts, no matter what the shape thereof. This polymerization and/or crosslinking takes place without any temperature rise, which makes it possible to obtain composite material parts having an excellent quality and free from faults resulting from the prior art processes.

This process makes it possible to reduce the costs of treating parts, because the polymerization process times are very short. Thus, polymerization and/or crosslinking takes less than 1 second at a given point of the part and the energy consumed is very low ($\sim 10$ kW).

With the process and apparatus according to the invention, tubes were produced from a composite material with a length of 15 m, an internal diameter of 442 mm and an external diameter of 475 mm. These tubes are formed from a central 13.4 m long portion, constituted by carbon fibers bonded to one another by a modified epoxy resin, such as that marketed by AKZO under the trade name DIACRYL 103 and two connecting end fittings each having a length of 0.8 m, formed from steel inserts hooped by composite material identical to that of the central portion.

The surface mass of the central tube is 2.5 g/cm$^2$, so that it was treated with electron radiation whereas the end fittings with a surface mass between 10.8 and 2.5 g/cm$^2$ were treated by X-rays and electrons, when said surface mass was below 4 g/cm$^2$. The X-ray polymerization time of said tube is 1 hour 50 minutes and 21 minutes for irradiation by electrons, the power of the electron beam being 10 kW. When the same tubes were produced by a conventional hot process with heating in the oven and then cooling, the overall time necessary was 70 hours.

What is claimed is:

1. An industrial polymerization and/or cross-linking process for a hardening resin by ionizing radiation, said resin being used in the composition of a part having a variable surface mass and having a reinforcement embedded in said resin, also having at least one insert of a different nature from said resin and said reinforcement, said process comprising the steps of supplying to said part an electron beam having an energy at least equal to 10 MeV in order to polymerize by said electron beam the resin in zones thereof having a surface mass at the most equal to 4 g/cm$^2$ and automatically arranging a target between the part and said electron beam, in order to polymerize the resin in zones of the part having a surface mass above 4 g/cm$^2$ by X-radiation at doses up to 10 Mrad, said target being able to produce the X-radiation under the action of said electron beam.

2. The process according to claim 1, wherein the insert is of radiohardening material, and X-radiation doses above 10 Mrad are used for crosslinking said radiohardening material.

3. The process according to claim 1, wherein the electron beam has an energy at least equal to 10 MeV and/or a power at least equal to 10 kW.

4. The process according to claim 1, wherein the target is made from a metallic material.

5. The process according to claim 1, wherein the target is made from a material having an atomic number at least equal to 74.

6. The process according to claim 1, wherein there is a relative movement between the part and either the X or electron radiation, so as to expose all or a portion of said part to one of the said irradiations.

7. The process according to claim 1, wherein the composite material contains metal inserts.

8. The process according to claim 1, wherein the resin is an ethylenically unsaturated resin.

* * * * *